United States Patent

Kanari et al.

[11] Patent Number: 5,611,260
[45] Date of Patent: Mar. 18, 1997

[54] PISTON RING MOUNT STRUCTURE

[75] Inventors: Issei Kanari; Munehiro Awataguchi, both of Atsugi, Japan

[73] Assignee: Unisia Jecs Corporation, Atsugi, Japan

[21] Appl. No.: 679,804

[22] Filed: Jul. 15, 1996

Related U.S. Application Data

[63] Continuation of Ser. No. 271,739, Jul. 7, 1994, abandoned.

[51] Int. Cl.$^6$ .................................................. F16J 9/00
[52] U.S. Cl. ........................... 92/248; 277/165; 277/227
[58] Field of Search ..................... 277/165, 178, 277/227, 188 R; 92/138, 240, 246, 248, 249

[56] References Cited

U.S. PATENT DOCUMENTS

| | | | |
|---|---|---|---|
| 1,802,281 | 4/1931 | Shimer | 92/249 |
| 2,228,495 | 1/1941 | Williams | 277/178 |
| 2,296,116 | 9/1942 | Pelc | 277/178 |
| 3,136,228 | 6/1964 | Dailey | 92/249 |
| 3,600,045 | 8/1971 | Inoue | 277/178 |
| 3,704,893 | 12/1972 | Hill | 277/178 |
| 3,885,460 | 5/1975 | Park | 277/178 |
| 5,435,233 | 7/1995 | Bowell, Sr. | 92/240 |

FOREIGN PATENT DOCUMENTS 61-82072  4/1986  Japan .
4-81074  12/1992  Japan .

Primary Examiner—Daniel G. DePumpo
Attorney, Agent, or Firm—Foley & Lardner

[57] ABSTRACT

A piston ring of Teflon (trademark of E.I du Pont de Nemours & Co, Ltd.), i.e., polytetrafluorethylene fiber, is mounted on a piston. The piston ring has an integral portion in the form of a series of axially spaced circumferential projections received in the respective circumferential spaced grooves of the piston. The piston is projected radially and outwardly to abut an axial end of a sleeve portion of the piston ring to limit axial movement of the piston ring.

12 Claims, 1 Drawing Sheet

PISTON RING MOUNT STRUCTURE

This application is a continuation of application Ser. No. 08/271,739, filed Jul. 7, 1994 now abandoned.

BACKGROUND OF THE INVENTION

The present invention relates to a piston head assembly and more particularly to a piston head with a piston ring of polytetrafluorethylene fiber.

JP-B2 4-81074 published on Dec. 22, 1922 discloses a piston head with a piston ring of polytetrafluorethylene fiber. According to this prior art, the piston ring has a series of axially spaced projections received in a series of circumferentially spaced grooves with which the piston head is formed. The piston head has a deeper groove and a tapered surface partly defining the deeper groove, while the piston ring is turned toward its axial end to mate with the tapered surface.

An object of the present invention is to provide an improved piston head assembly of the above kind.

SUMMARY OF THE INVENTION

According to the present invention, there is provided a piston head assembly comprising:

a piston adapted for a reciprocating movement along an axis, said piston including two axially spaced end walls, with respect to said axis, and a peripheral side wall extending between and interconnecting said two axially spaced end walls; and a piston ring including a sleeve portion and a teeth portion integral with said sleeve portion;

said peripheral side wall of said piston including a section recessed to receive said teeth portion of said piston ring, said peripheral side wall of said piston including a projecting section projecting radially, with respect to said axis, and outwardly, with respect to said recessed section, said projecting section being disposed between said recessed section and the adjacent one of said two axially spaced end walls and in abutting engagement with an axial end of said sleeve portion of said piston ring.

DESCRIPTION OF THE EMBODIMENT

Figure 1:
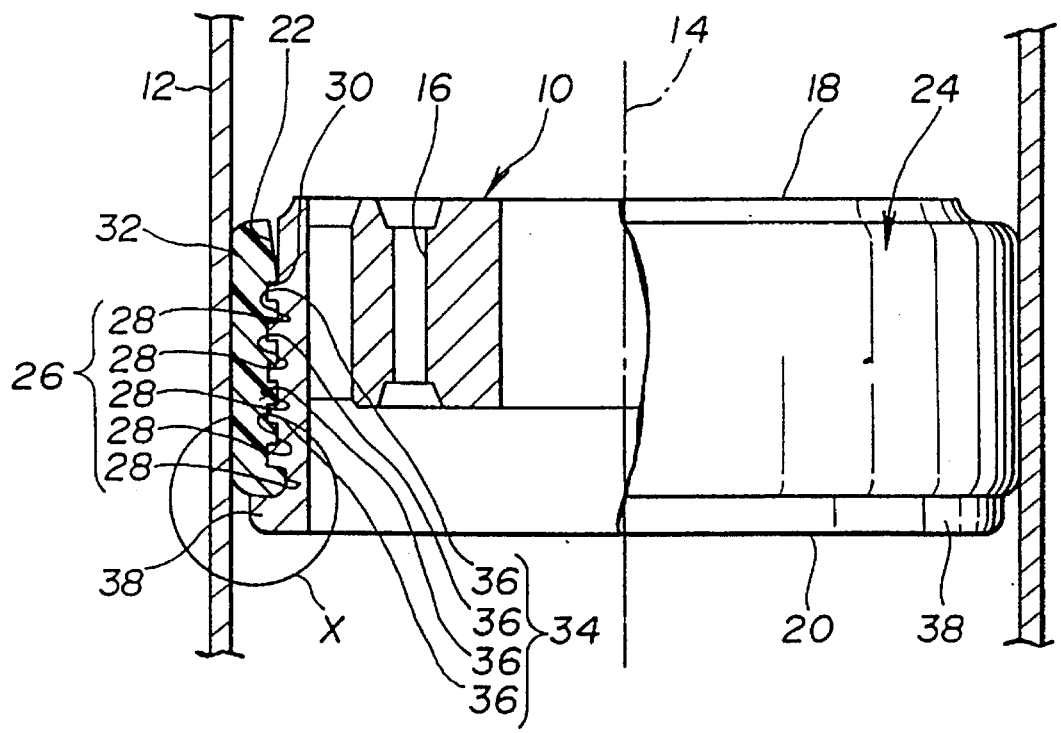
FIG. 1 is a side elevation, partly sectioned, of a piston head assembly according to the present invention.

FIG. 1 shows a piston head assembly 10 according to the present invention in association with a cylinder 12 which contains hydraulic fluid. In use, the piston head assembly 10 is fixedly attached to a plunger, not shown, for a to-and-fro (that is, reciprocating) movement along an axis 14 of the cylinder 12.

The piston head assembly 10 comprises a psiton 16. The piston 16 includes two end walls 18 and 20 axially spaced with respect to the axis 14, and a peripheral cylindrical side wall 22 extending between and interconnecting the two axially spaced end walls 18 and 20.

The piston head assembly 10 also comprises a piston ring 24 of polytetrafluorethylene fiber, i.e., "Teflon" (trademark of E. I. du Pont de Nemours & Co. Inc.). The piston ring 24 includes a teeth portion 26 integral with a sleeve portion 32 thereof. This portion 26 is in the form of a series of circumferential projections 28 on the inner peripheral surface 30 of the sleeve portion 32 of the piston ring 24.

Figure 2:
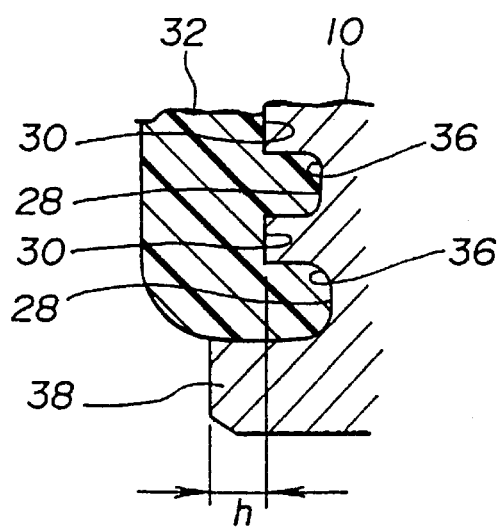
FIG. 2 is a fragmentary enlarged view of a portion enclosed by a circle X in FIG. 1.

The peripheral side wall 22 of the piston 16 includes a section 34 recessed to receive the teeth portion 26 of the piston ring 24 to lock the piston ring 24 relative to the piston 16. The recessed section 34 is in the form of a series of circumferential grooves 36 spaced along the axis 14. The series of circumferential projections 28 mate with the respective circumferential grooves To limit an axial movement of the piston ring 24 along the axis 14, the peripheral side wall 22 of the piston 16 includes a projecting section 38 projecting radially, with respect to the axis 14, and outwardly by a distance h (see FIG. 2), with regard to the recessed section 34. The projecting section 38 is disposed between the recessed section 34 and the end wall 20 for abutting engagement with an axial end of the sleeve portion 32.

During reciprocating movement of the piston head assembly 10 within the cylinder 12, the sleeve portion 32 of the piston ring 24 is subjected to axial stress. This axial stress is beared not only by the projections 28 received in the grooves 36, but also by the sleeve portion 32 supported by the projecting section 38 during a movement of the piston head assembly 10 in an upward direction viewing in Fig. 1, thus decreasing stress is applied to the projections 28 of the teeth portion 26 of the piston ring 24.

According to the embodiment, the radially and outwardly projected section 38 continues to extend circumferentially without any interruption.

What is claimed is:

1. A piston head assembly for a reciprocal movement within a cylinder along an axis of the cylinder, comprising:

a piston including a first and a second axially spaced end wall, with respect to said axis, and a peripheral side wall extending between and interconnecting said first and second axially spaced end walls; and a piston ring including a sleeve portion and a teeth portion integral with said sleeve portion, said peripheral side wall of said piston including a section recessed to receive said teeth portion of said piston ring, said peripheral side wall of said piston including a projecting section projecting radially, with respect to the axis, and outwardly, by a predetermined distance, with respect to said recessed section, said projecting section being disposed between said recessed section and said first end wall and in abutting engagement with an axial end of said sleeve portion of said piston ring;

wherein a distance between said first end wall and said recessed section is less than the distance between said second end wall and said recessed section, wherein said sleeve portion includes an inner peripheral surface, wherein said teeth portion includes teeth projecting radially inward, with respect to the axis, from said inner peripheral surface, and wherein said peripheral side wall is free of a projecting section proximate said second axially spaced end wall.

2. A piston head assembly for a reciprocal movement within a cylinder along an axis of the cylinder, comprising:

a piston including a first and a second axially spaced end wall, with respect to said axis, and a peripheral side wall extending between and interconnecting said first and second axially spaced end walls;

a piston ring including a sleeve portion having at least one axial end and a teeth portion integral with said sleeve portion;

a recessed section in said peripheral side wall of said piston to receive said teeth portion of said piston ring; and a projecting section in said peripheral side wall of said piston, said projecting section extending radially outward with respect to said axis and by a predetermined distance with respect to said recessed section, said projecting section being disposed between said recessed section and said first end wall and in abutting engagement with the axial end of said sleeve portion of said piston ring, wherein the distance between said first end wall and said recessed section is less than the distance between said second end wall and said recessed section, and wherein said peripheral side wall is free of a projecting section proximate said second axially spaced end wall.

3. A piston head assembly according to claim 2, wherein a radial thickness of the sleeve, with respect to said axis, is at least twice said predetermined distance by which said projecting section projects radially outward, with respect to said axis.

4. A piston head assembly according to claim 2, wherein an axial length of the sleeve, with respect to said axis, is greater than one-half of an axial length of the piston, with respect to said axis.

5. A piston head assembly according to claim 2, wherein said abutting engagement is free of visual clearance.

6. A piston head assembly according to claim 2, wherein said teeth portion is in contact with said recessed section.

7. A piston head assembly according to claim 2, wherein said teeth portion includes at least one tooth projecting radially inward, with respect to said axis.

8. A piston head assembly according to claim 2, wherein said teeth portion includes at least three teeth projecting radially inward, with respect to said axis.

9. A piston head assembly according to claim 2, wherein said sleeve portion has an inner and an outer surface with the inner surface integral with said teeth portion and the outer surface having a curvature at said axial end of the sleeve portion.

10. A piston head assembly according to claim 2, wherein the piston ring material is comprises polytetrafluoroethylene.

11. A piston head assembly according to claim 10, wherein the piston is metallic.

12. A piston head assembly for a reciprocal movement within a cylinder along an axis of the cylinder, comprising:

a piston including a first and a second axially spaced end wall, with respect to said axis, and a peripheral side wall extending between and interconnecting said first and second axially spaced end walls;

a piston ring including a sleeve portion having at least one axial end and a teeth portion integral with said sleeve portion, wherein said teeth portion includes at least three teeth projecting radially inward, with respect to said axis;

a recessed section in said peripheral side wall of said piston to receive said teeth portion of said piston ring; and a projecting section in said peripheral side wall of said piston, said projecting section extending radially outward with respect to said axis and by a predetermined distance with respect to said recessed section, said projecting section being disposed between said recessed section and said first end wall and in abutting engagement with the axial end of said sleeve portion of said piston ring, wherein the distance between said first end wall and said recessed section is less than the distance between said second end wall and said recessed section, wherein said peripheral side wall is free of a projecting section proximate said second axially spaced end wall, wherein an axial length of the sleeve, with respect to said axis, is greater than one-half of an axial length of the piston, with respect to said axis, wherein said teeth portion is in contact with said recessed section, wherein said sleeve portion has an inner and outer surface with the inner surface integral with said teeth portion and the outer surface having a curvature at said axial end of the sleeve portion, and wherein the piston ring is polytetrafluoroethylene.

\* \* \* \* \*